(12) United States Patent
Hashiba et al.

(10) Patent No.: US 11,396,064 B2
(45) Date of Patent: Jul. 26, 2022

(54) WELDING STRUCTURE

(71) Applicant: AISAN KOGYO KABUSHIKI KAISHA, Obu (JP)

(72) Inventors: Hirofumi Hashiba, Obu (JP); Makoto Fukui, Nagoya (JP); Hiroshi Sugiura, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 303 days.

(21) Appl. No.: 16/760,268

(22) PCT Filed: Nov. 27, 2018

(86) PCT No.: PCT/JP2018/043614
§ 371 (c)(1),
(2) Date: Apr. 29, 2020

(87) PCT Pub. No.: WO2019/146243
PCT Pub. Date: Aug. 1, 2019

(65) Prior Publication Data
US 2020/0290158 A1    Sep. 17, 2020

(30) Foreign Application Priority Data
Jan. 29, 2018 (JP) .............................. JP2018-012776

(51) Int. Cl.
B23K 31/02 (2006.01)
F16K 1/22 (2006.01)
F16K 1/226 (2006.01)

(52) U.S. Cl.
CPC .............. *B23K 31/02* (2013.01); *F16K 1/221* (2013.01); *F16K 1/222* (2013.01); *F16K 1/2263* (2013.01); *F16K 1/2268* (2013.01)

(58) Field of Classification Search
CPC ......... B23K 31/02; F16K 1/221; F16K 1/222; F16K 1/2263; F16K 1/2268; F16K 1/22
(Continued)

(56) References Cited

U.S. PATENT DOCUMENTS 4,335,738 A * 6/1982 Nassir ..................... F16K 1/222
137/246.22
6,589,380 B2 * 7/2003 Gnage ................... B29C 66/526
251/307
(Continued)

FOREIGN PATENT DOCUMENTS

JP   H04-228277 A   8/1992
JP   2016-133076 A  7/2016
(Continued)

OTHER PUBLICATIONS

Feb. 19, 2019 International Search Report issued in International Patent Application No. PCT/JP2018/043614.
(Continued)

Primary Examiner — John Bastianelli
(74) Attorney, Agent, or Firm — Oliff PLC

(57) ABSTRACT

A welding structure includes, in a cross-section of the first member and the second member when they are seen from an axial direction of the insertion hole, a plurality of welding spots, an outer periphery of the welding spots are each formed with a curve-shaped portion and two side-face portions. When two intersections where the outer side-face portion on the outer periphery of the both-end welding spots and the outer periphery of the second member intersect are defined as a first intersection and a second intersection, a weld angle formed by a first linear line linking the first intersection with a sectional center of the second member and a second linear line linking the second intersection with
(Continued)

the sectional center of the second member is set to a first predetermined angle or more.

12 Claims, 13 Drawing Sheets

(58) Field of Classification Search
USPC .................................................. 251/305–308
See application file for complete search history.

(56) References Cited

U.S. PATENT DOCUMENTS

| | | | |
|---|---|---|---|
| 7,172,174 B2* | 2/2007 | Sano | B29C 66/863 |
| | | | 219/121.64 |
| 2005/0184268 A1* | 8/2005 | Narayanaswamy | ......................... |
| | | | B29C 66/7392 |
| | | | 251/308 |
| 2016/0290513 A1* | 10/2016 | Asanuma | F16K 1/2014 |

FOREIGN PATENT DOCUMENTS

| | | |
|---|---|---|
| JP | 2017-172609 A | 9/2017 |
| JP | 2017-210978 A | 11/2017 |

OTHER PUBLICATIONS

Dec. 4, 2019 International Preliminary Report on Patentability issued in International Patent Application No. PCT/JP2018/043614.

* cited by examiner

WELDING STRUCTURE

CROSS-REFERENCE TO RELATED APPLICATIONS

This is a US national phase application based on the PCT International Patent Application No. PCT/JP2018/043614 filed on Nov. 27, 2018, and claiming the priority of Japanese Patent Application No. 2018-012776, filed on Jan. 29, 2018, the entire contents of which are herewith incorporated by reference.

TECHNICAL FIELD

The present disclosure relates to a welding structure of welding a first member and a second member in a manner that the second member is inserted in an insertion hole of the first member and welded.

BACKGROUND ART

Conventionally, a valve device described in Patent Literature 1 has been known. This valve device includes a valve provided in its center with an insertion hole, and the device is configured that a shaft and the valve are welded in a state in which one end of the shaft is inserted in the insertion hole of the valve.

RELATED ART DOCUMENTS

Patent Documents

Patent Document 1: JP2016-133076A

SUMMARY OF INVENTION

Problems to be Solved by the Invention

When the valve device described in the Patent Literature 1 is to be shifted from a valve-open state to a valve-closed state, the valve comes to contact with a sitting seat to generate stress on a welded part, so that stress occurs on the welded part of the shaft and the valve. This repeatedly-generated stress may cause fatigue destruction of the welded part.

To address this, it has been conceived to increase a welding depth of the welded part for improving the endurability of the welded part. However, increase in the welding depth requires higher output for welding. Further, increase in the welding output further increases an amount of heat applied to the welded part, and this could lead to increase in welding distortion and sensitization (a phenomenon of decrease in corrosion resistance due to thermal history) of the welded part.

The present disclosure has been made in view of the circumstances to solve the above problems and has a purpose of providing a welding structure achieving restraint in the required welding outlet and improving endurability of the welded part.

Means of Solving the Problems

To achieve the above purpose, one aspect of the present disclosure provides a welding structure comprising a first member provided with an insertion hole and a second member, the welding structure being configured such that the second member is inserted in the insertion hole to be welded to the first member, wherein, in a cross-section of the first member and the second member when they are seen from an axial direction of the insertion hole, a plurality of welding spots where the first member and the second member are welded are provided, an outer periphery of each of the welding spots is formed with a curve-shaped portion formed on a leading end in a direction from a first-member side to a second-member side and two side-face portions connected to both ends in a circumferential direction of the curve-shaped portion, respectively, in both-end welding spots provided on both ends in an arrangement direction of the welding spots in a weld region that is formed of the plurality of welding spots, the first member and the second member are welded such that an outer side-face portion, which is one of the two side-face portions on the outer periphery of the both-end welding spots located on an outer side of the weld region, intersects with an outer periphery of the second member, and when two intersections where the outer side-face portion on the outer periphery of the both-end welding spots and the outer periphery of the second member intersect are defined as a first intersection and a second intersection, a weld angle formed by a first linear line linking the first intersection with a sectional center of the second member and a second linear line linking the second intersection with the sectional center of the second member is set to a first predetermined angle or more.

According to this aspect, the welding region is configured with the plurality of welding spots to expand the weld angle, thus improving the endurability of the welded part without increasing the welding depth of the respective welding spots. Accordingly, the required welding output can be made small and it is possible to restrain welding distortion and sensitization of the welded part. As a result of this, endurability of the welded part can be improved with restraining the required welding output.

Further, the outer periphery of the second member is made to intersect the outer side-face portion of the both-end welding spots, thus restraining occurrence of error in the weld angle and restraining occurrence of error in the endurability of the welded part.

In the above aspect, preferably, the outer periphery of the insertion hole of the first member and the outer periphery of the second member are arranged with a clearance in a region other than the weld region.

According to the above aspect, stress is concentrated on a welding spot especially in a structure arranged with a clearance, and therefore, adoption of the present technique leads to improvement in endurability on a stress-concentrated spot.

In the above aspect, preferably, the plurality of welding spots are spaced from one another.

According to the above aspect, a weld angle can be increased while reducing the number of the welding spots (in other words, reducing a total welded area of the plurality of welding spots). Accordingly, a total amount of output required for welding can be restrained, and thus the endurability of the welded part can be improved.

In the above aspect, preferably, two welding spots are provided.

According to the above aspect, the weld angle can be increased while reducing the number of the welding spots to the maximum. Accordingly, the total amount of output required for welding can be restrained to the maximum, and the endurability of the welded part can be improved.

In the above aspect, preferably, the first predetermined angle is changeable depending on a shape of the outer periphery of the second member.

According to this aspect, the endurability of the welded part can be improved according to the shape of the outer periphery of the second member.

In the above aspect, preferably, the shape of the outer periphery of the second member is any one of a circular shape and an almost-circular shape, and the first predetermined angle is 65° or more.

According to this aspect, the endurability of the welded part can be improved to the almost maximum.

In the above aspect, preferably, when the weld angle is set to a second predetermined angle that is larger than the first predetermined angle and that has a possibility of causing inclination of the first member, at least one welding spot is provided in a center or an almost center of the weld region defined by the second predetermined angle.

According to this aspect, the first member and the second member can be welded in a desired arrangement state.

In the above aspect, preferably, the first member is a valve element, and the second member is a rotary shaft for rotating the valve element.

In the above aspect, preferably, the valve element is a butterfly valve.

Effects of the Invention

According to a welding structure of the present disclosure, it is achieved that an output required for welding is restrained and endurability of a welded part is improved.

MODE FOR CARRYING OUT THE INVENTION

A detailed description of an embodiment of a welding structure of the present disclosure will now be given below with exemplifying a welding structure of a valve element and a rotary shaft of a double eccentric valve that is adopted for a flow control valve 1. Firstly, the flow control valve 1 is explained, and subsequently, the welding structure of the valve element and the rotary shaft of the double eccentric valve is explained.

Figure 1:
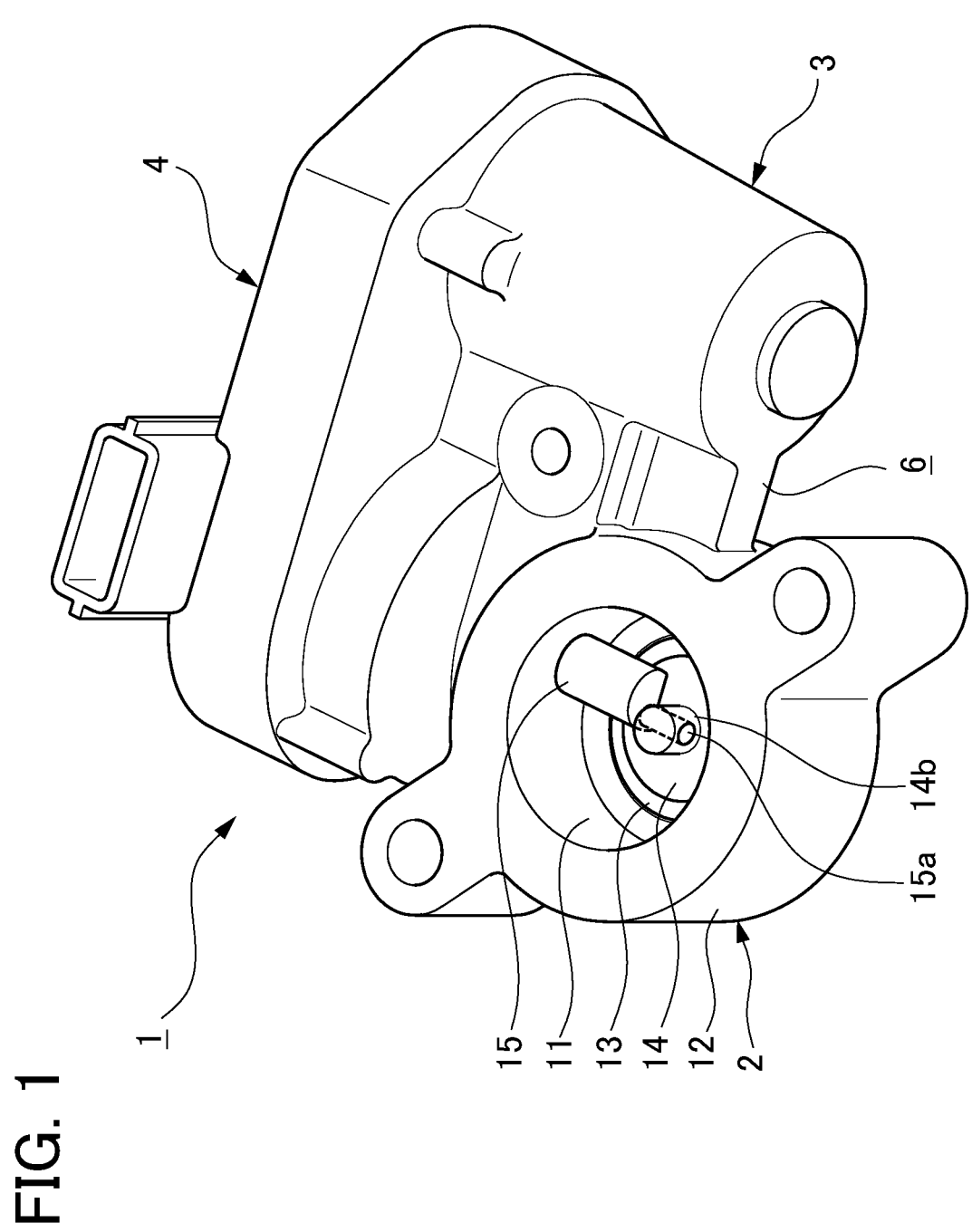
FIG. 1 is a perspective view showing one example of a flow control valve provided with a double-eccentric valve.
Figure 2:
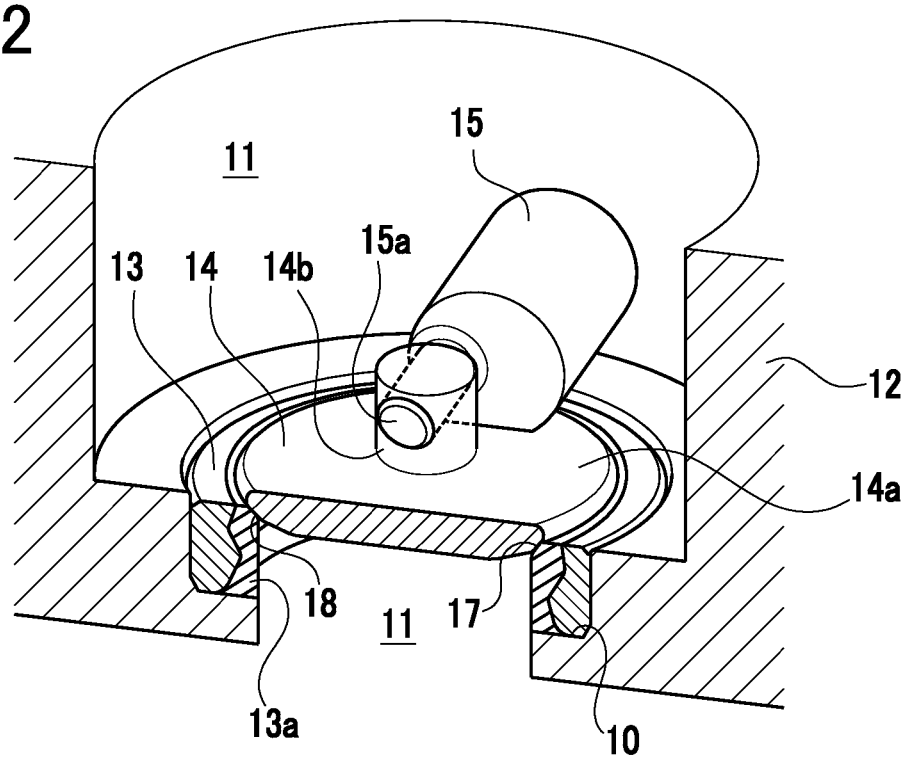
FIG. 2 is a partially-cutaway perspective view of a valve section in a valve fully-closed state.
Figure 3:
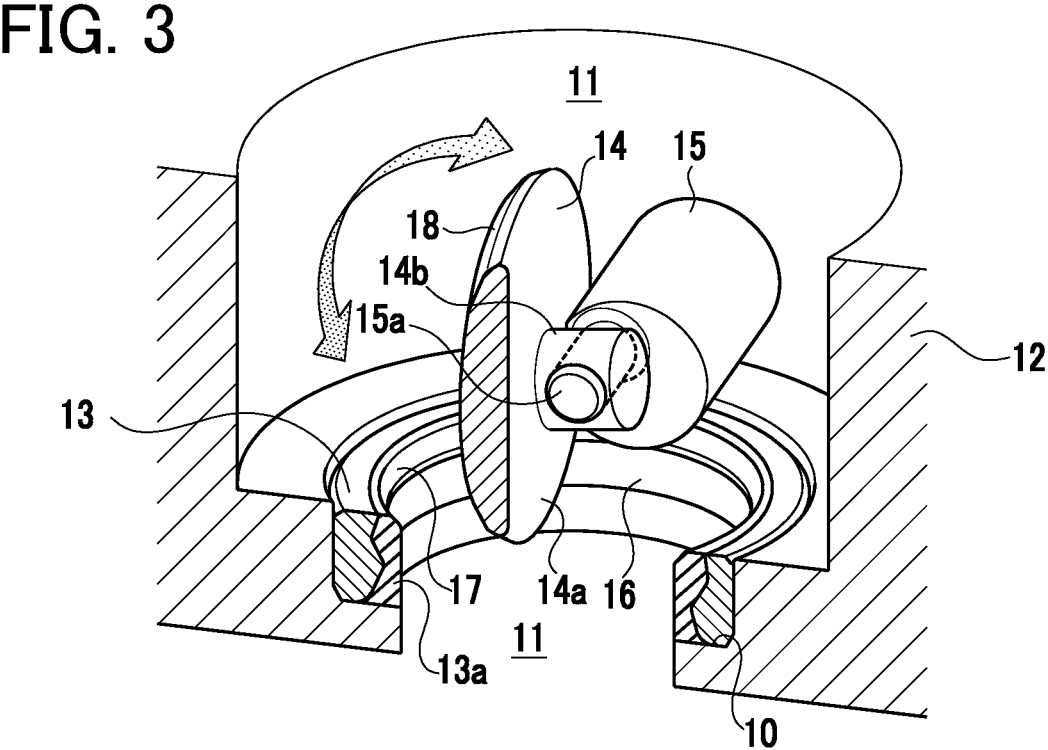
FIG. 3 is a partially-cutaway perspective view of the valve section in a valve fully-open state.

As shown in FIG. 1, the flow control valve 1 is provided with a valve section 2 configured with a double eccentric valve, a motor section 3 embedded with a motor, and a speed-reducing mechanism 4 embedded with a plurality of gears. As shown in FIGS. 2 and 3, the valve section 2 includes a metal pipe portion 12 including a passage 11 inside of which fluid flows, and a valve seat 13, a valve element 14, and a rotary shaft 15 are placed is the passage 11. An inner shape of the passage 11, an outer shape of the valve seat 13, and an outer shape of the valve element 14 are each formed to be a circular shape or an almost circular shape in plan view. To the rotary shaft 15, a rotational force of a motor is made to be transmitted via the plurality of gears. In the present embodiment, the pipe portion 12 having the passage 11 corresponds to a part of a housing 6, and the motor of the motor section 3 and the plurality of gears of the speed-reducing mechanism 4 are covered with the housing 6. The housing 6 is formed of metal such as aluminum.

The passage 11 is provided with a step portion 10 and the valve seat 13 is fitted in this step portion 10. The valve seat 13 is of an annular shape and has a circular or almost circular valve hole 16 in its center. The valve hole 16 is formed with an annular seat surface 17 on its peripheral edge. In the present embodiment, the valve seat 13 is provided with a rubber sealing portion 13a, and the seat surface 17 is formed on this rubber sealing portion 13a. The valve element 14 is one type of a butterfly valve of a disc-like shape, and is formed with an annular sealing surface 18 corresponding to the seat surface 17 on its outer periphery. The valve element 14 is fixed to the rotary shaft 15 to be integrally rotated with the rotary shaft 15.

Figure 5:
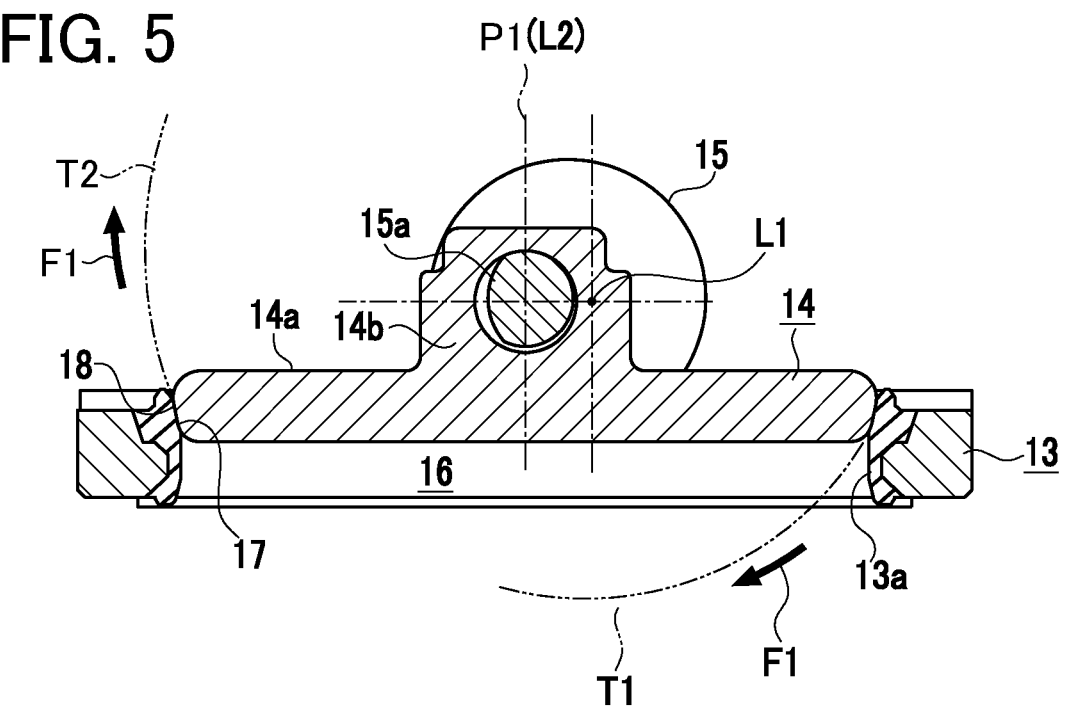
FIG. 5 is a cross-sectional view taken along a line A-A in FIG. 4.

As shown in FIG. 5, an axial line L1 of the rotary shaft 15 extends in parallel with a radial direction of the valve element 14 and the valve hole 16 and is positioned eccentrically from a center P1 of the valve hole 16 to a radial direction of the valve hole 16. Further, the sealing surface 18 of the valve element 14 is positioned eccentrically from the axial line L1 of the rotary shaft 15 to an extending direction of an axial line L2 of the valve element 14. Furthermore, the sealing surface 18 of the valve element 14 is configured to be moved between a valve fully-closed position (see FIG. 2) where the sealing surface 18 comes to surface contact with the seat surface 17 of the valve seat 13 and a valve fully-open position (see FIG. 3) where the sealing surface 18 is placed furthest from the seat surface 17 by rotation of the valve element 14 centering about the axial line L1 of the rotary shaft 15.

In the present embodiment, in FIG. 5, when the valve element 14 starts to rotate in a valve-opening direction (a direction indicated with an arrow F1 in FIG. 5, namely, in a clockwise direction in FIG. 5) from the valve fully-closed position, the sealing surface 18 of the valve element 14 concurrently starts to move away from the seat surface 17 of the valve seat 13 and move along rotation tracks T1 and T2 both centering about the axial line L1 of the rotary shaft 15.

Figure 4:
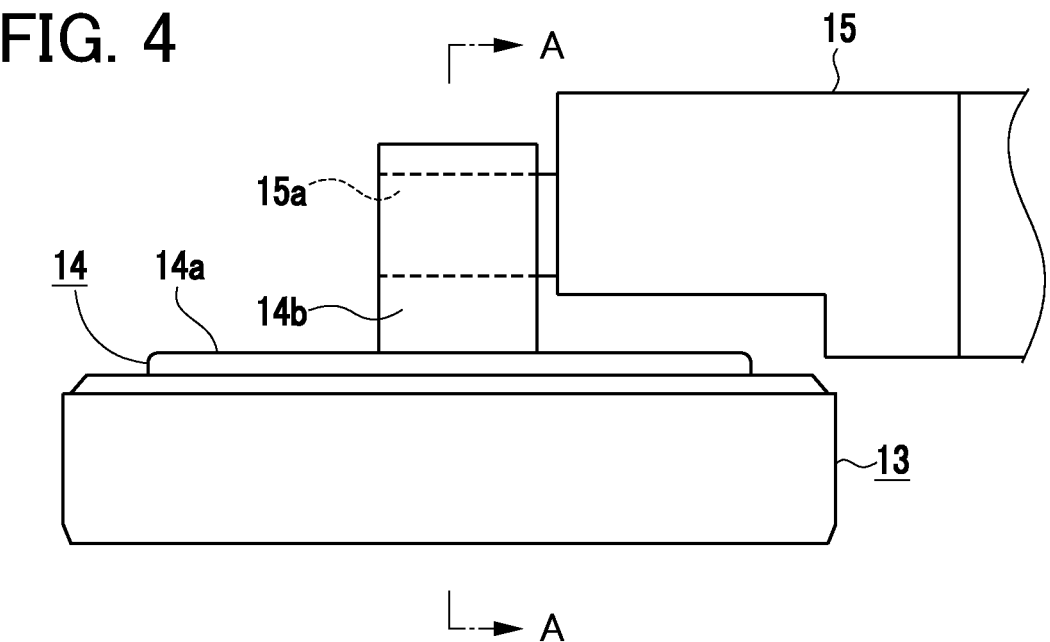
FIG. 4 is a side view of a valve seat, a valve element, and a rotary shaft in a valve closed state.

As shown in FIGS. 4 and 5, the valve element 14 includes a fixing portion 14b of a ridge-like shape protruding from a plate face 14a to be fixed with the rotary shaft 15 formed thereon. The fixing portion 14b is fixed to the rotary shaft 15 via a pin 15a protruding from a leading end of the rotary shaft 15 in a position displaced from the axial line L1 of the rotary shaft 15 to the radial direction of the rotary shaft 15. Further, as shown in FIG. 5, the fixing portion 14b is placed on the axial line L2 of the valve element 14 so that the valve element 14 including the fixing portion 14b is formed to be in a laterally symmetrical shape centering about the axial line L2 of the valve element 14. As it will be described in detail below, the valve element 14 and the rotary shaft 15 are welded together, but in FIG. 5, a welded part of the valve element 14 and the rotary shaft 15 is omitted its illustration.

Subsequently, a welding structure of the valve element 14 (one example of a "first member") and the rotary shaft 15 (one example of a "second member") in a double eccentric valve is explained.

Figure 6:
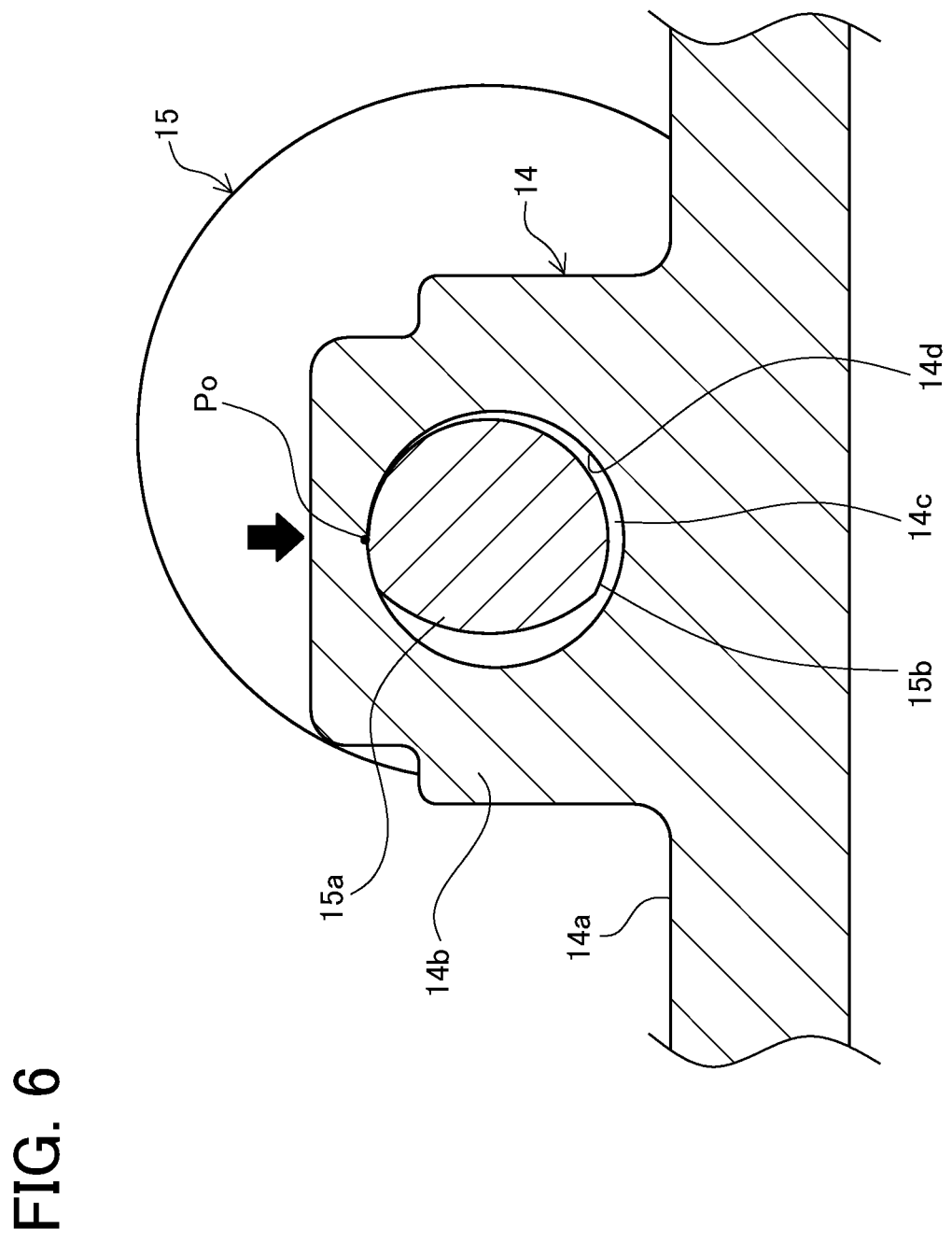
FIG. 6 is a sectional view illustrating a state in which a pin of the rotary shaft is inserted in an insertion hole of the valve element.

When the valve element 14 and the rotary shaft 15 are to be welded to form the welding structure of the valve element 14 and the rotary shaft 15, as shown in FIG. 6, the pin 15a of the rotary shaft 15 is firstly inserted in an insertion hole 14c formed in the fixing portion 14b of the valve element 14. At this time, on an upper side of the insertion hole 14c in FIG. 6, an inner wall surface 14d forming an outer shape of the insertion hole 14c and an outer peripheral surface 15b of the pin 15a are contacted at a contact point Po. In other words, in a cross section of the valve element 14 and the rotary shaft 15 seen from an axial direction of the insertion hole 14c (in a frontward direction of a sheet of FIG. 6), the inner wall surface 14d of the insertion hole 14c is in a circular shape and the outer peripheral surface 15b of the pin 15a is in an almost circular shape. Namely, in the vicinity of the contact point Po, the curvature of the outer peripheral surface 15b of the pin 15a is made larger than the curvature of the inner wall surface 14d of the insertion hole 14c. The "almost circular shape" means a circular shape partially having different curvature in its circumferential direction. Further, a diameter of the insertion hole 14c is made larger than an outer diameter of the pin 15a, and thus the inner wall surface 14d of the insertion hole 14c and the outer circumferential surface 15b of the pin 15a are separated from each other in a lower portion of the insertion hole 14c in FIG. 6.

In the above-mentioned state, the valve element 14 and the rotary shaft 15 are welded from an upper side to a lower side in FIG. 6 (namely, from a side of the fixing portion 14b to a side of the plate face 14a in a direction of the axial line L2 (of a central axis, see FIG. 5) of the valve element 14) as indicated with an arrow in FIG. 6. In the present embodiment, the rotary shaft 15 is thus inserted in the insertion hole 14c to be welded and fixed to the valve element 14. Herein, the shape of the outer peripheral surface 15b of the pin 15a may be a circular shape.

Figure 18:
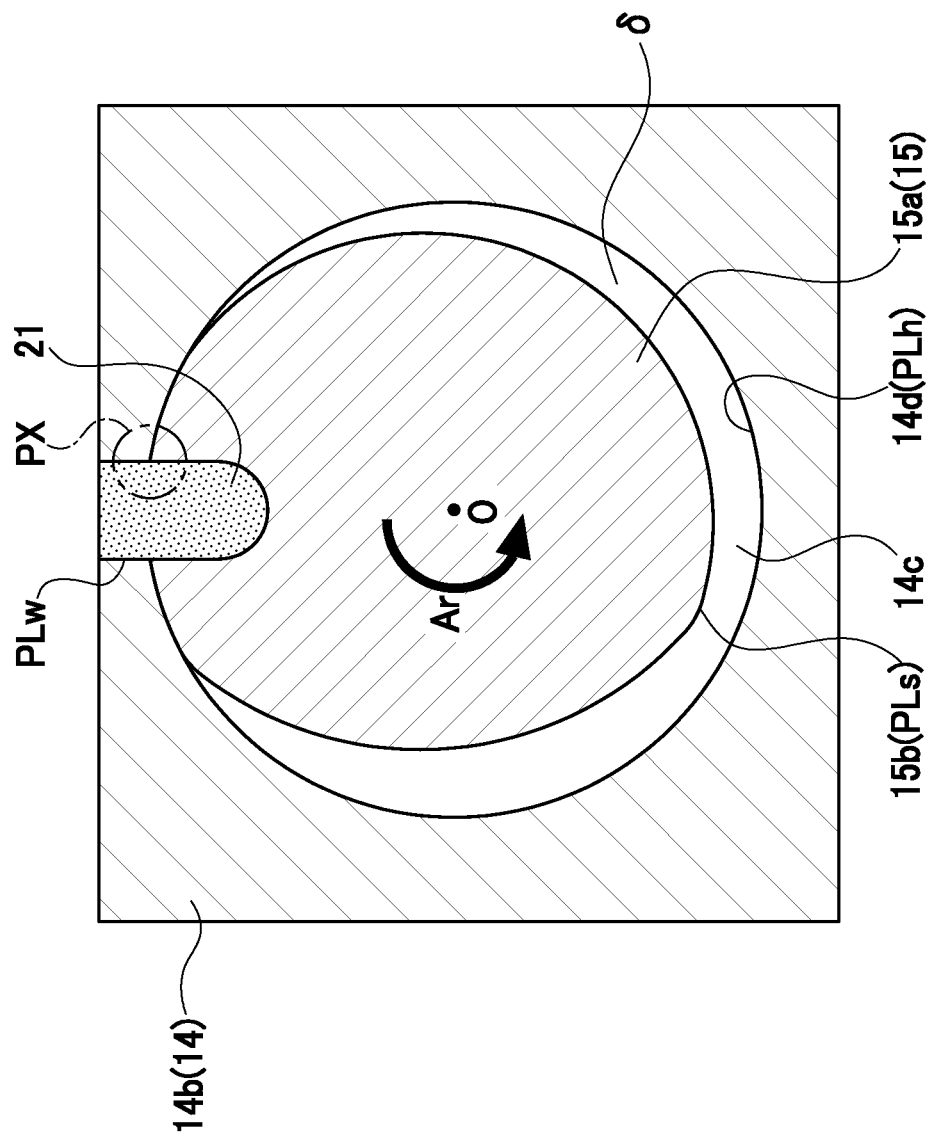
FIG. 18 is a sectional view illustrating a welding structure of providing one welding spot.

In the above-mentioned welding structure of the valve element 14 and the rotary shaft 15, for example, one example of providing one welding spot 21 as a welded part of the valve element 14 and the rotary shaft 15 (hereinafter, simply referred as "welded part") as shown in FIG. 18 is considered. In this example, when the pin 15a of the rotary shaft 15 is to be rotated in a direction indicated with an arrow Ar in the figure (in a counter-clockwise direction) centering about a sectional center O during valve-closing operation in which the valve is being shifted from a valve-open state to a valve-closed state, stress is generated concentrically on a stress concentrated region PX due to the load generated by collision of the valve element 14 with the rubber sealing portion 13a (see FIG. 5 and others) of the valve seat 13. Repetition of valve opening and closing operation results in repetitive generation of stress on the stress concentrated region PX, so that the welding spot 21 could suffer from fatigue destruction.

To address the above, it has been conceived to improve endurability of the welded part by enlarging a welding depth of the thus formed single welding spot 21 or increasing the welding width in order to reduce the stress generated on the stress concentrated region PX. Herein, the welding depth is a depth of a portion where welding has been made. However, the above measures require high output as output for welding and may lead to generation of distortion in the rotary shaft 15 due to the heat generated by increase in the welding output. Consequently, there are possibilities of causing degradation in the sealing performance between the valve seat 13 and the valve element 14 in the valve-closed state and causing sensitization of the welded part leading to its vulnerability.

Figure 7:
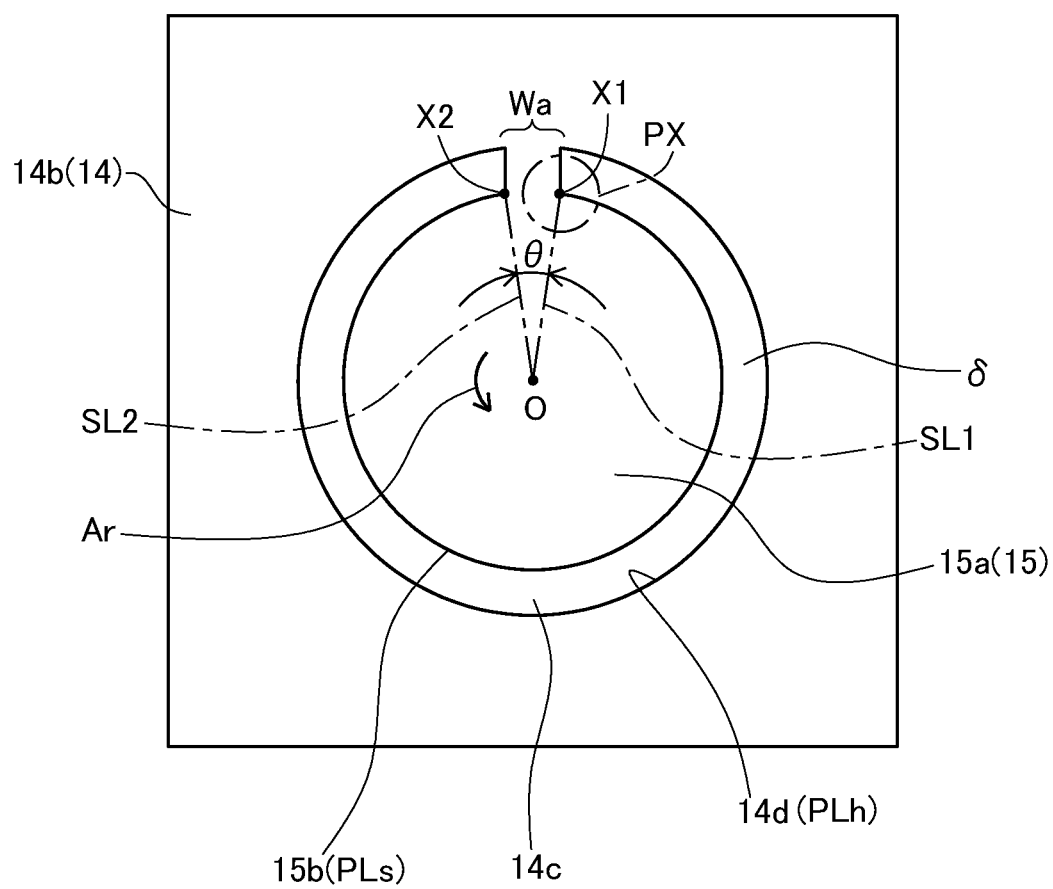
FIG. 7 is an explanatory diagram illustrating one example of an analysis model used for analyzing a relationship between a weld angle and a maximum principal stress.

In order to consider welding conditions that can restrain necessary welding output and improve the endurability of the welded part, a stress analysis has been made with an analysis model indicated in FIG. 7, for example, and evaluation for the endurability of the welded part has been made. In the analysis model shown in FIG. 7, a first intersection X1 and a second intersection X2 are two intersection points of both end portions of a weld region Wa with an outer periphery PLs of the rotary shaft 15, and the first intersection X1 and the second intersection X2 are each linked to a sectional center O of the rotary shaft 15 (rotation center of the rotary shaft 15) to draw a first linear line SL1 and a second linear line SL2. The thus depicted linear lines form a weld angle θ. Herein, the weld region Wa is a welded part of the valve element 14 and the rotary shaft 15 that is configured with one or a plurality of welding spots 21 as it will be shown in each of analysis specifications. FIG. 7 illustrates one example of the weld region Wa that is configured with one welding spot 21. Further, in a region other than the weld region Wa, an outer periphery PLh (the inner wall surface 14d) of the insertion hole 14c of the valve element 14 and the outer periphery PLs (the outer peripheral surface 15b) of the pin 15a of the rotary shaft 15 are arranged with a clearance δ.

Figure 8:
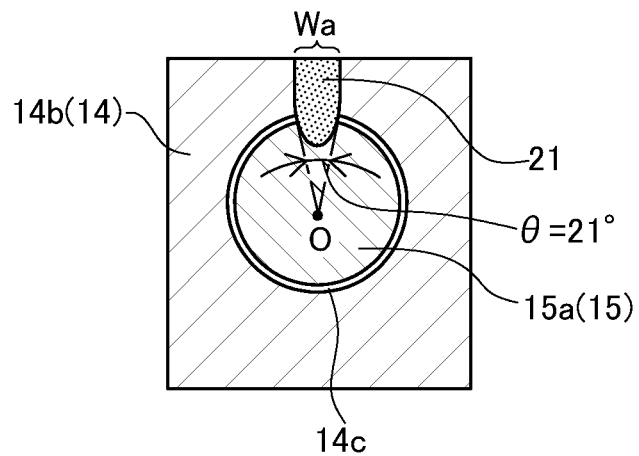
FIG. 8 is a diagram illustrating an analysis specification (1)
Figure 9:
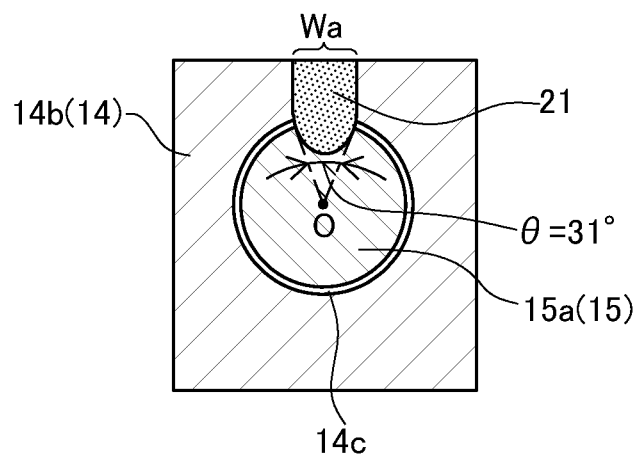
FIG. 9 is a diagram illustrating an analysis specification (2)
Figure 10:
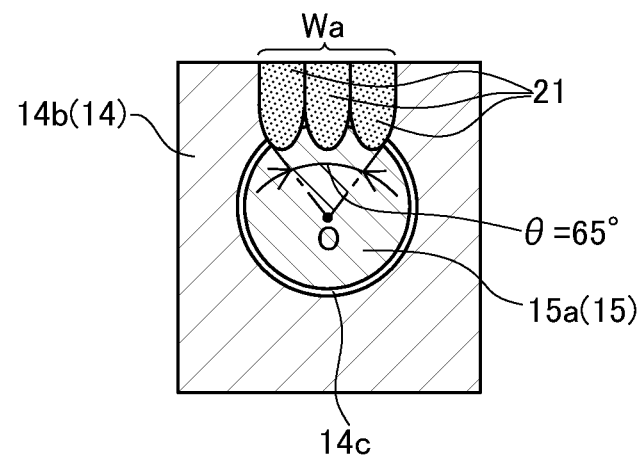
FIG. 10 is a diagram illustrating an analysis specification (3)
Figure 11:
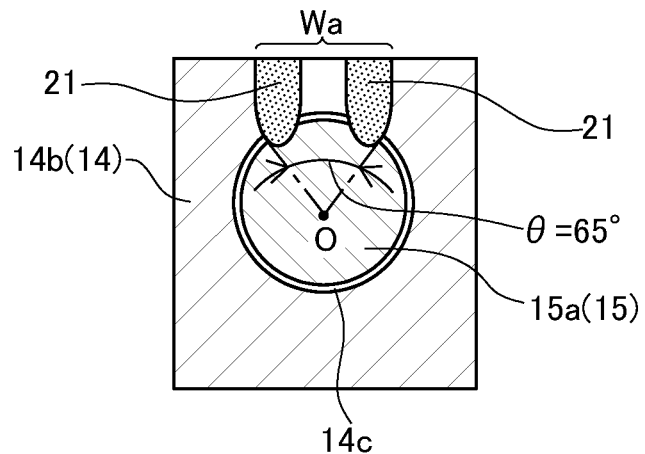
FIG. 11 is a diagram illustrating an analysis specification (4)
Figure 12:
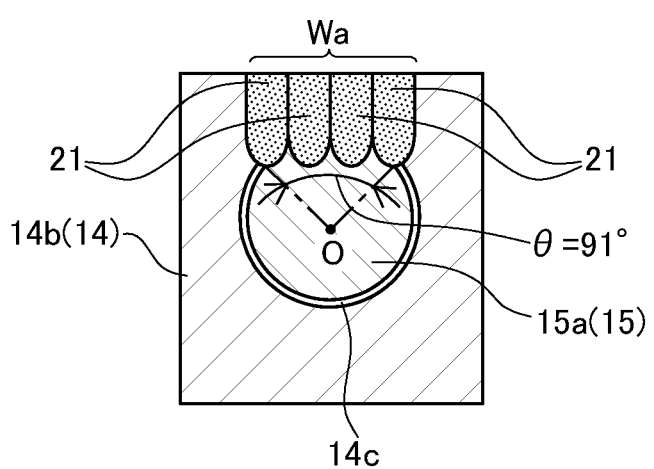
FIG. 12 is a diagram illustrating an analysis specification (5)
Figure 13:
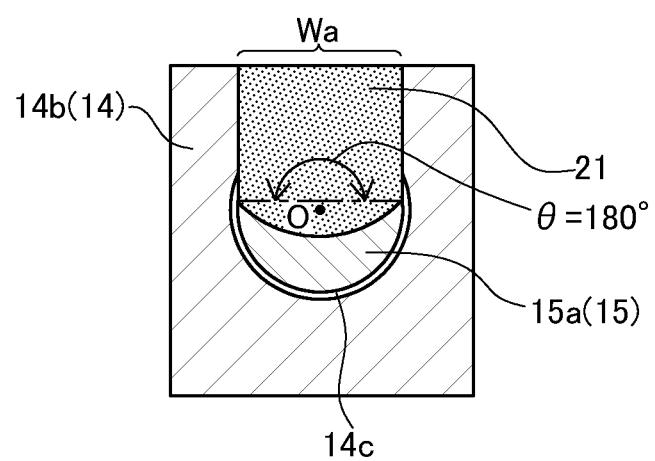
FIG. 13 is a diagram illustrating an analysis specification (6)

The analysis specifications are set with the various number of the welding spots 21 and various weld angles θ. To be specific, as shown in FIG. 8, an analysis specification (1) is arranged with the number of the welding spot 21 as one, the welding output as "small", and the weld angle θ of 21°. As shown in FIG. 9, an analysis specification (2) is arranged with the number of the welding spot 21 as one, the welding output as "medium", and the weld angle θ of 31°. As shown in FIG. 10, an analysis specification (3) is arranged with the number of the welding spots 21 as three, the welding output as "small", and the weld angle θ of 65°. As shown in FIG. 11, an analysis specification (4) is arranged with the number of the welding spots 21 as two, the welding output as "small", and the weld angle θ of 65° with creating a space between the two welding spots 21. As shown in FIG. 12, an analysis specification (5) is arranged with the number of the welding spots 21 as four, the welding output as "small", and the weld angle θ as 91°. As shown in FIG. 13, an analysis specification (6) is arranged with the number of the welding spot 21 as one, the welding output as "large", and the weld angle θ as 180°.

Figure 14:
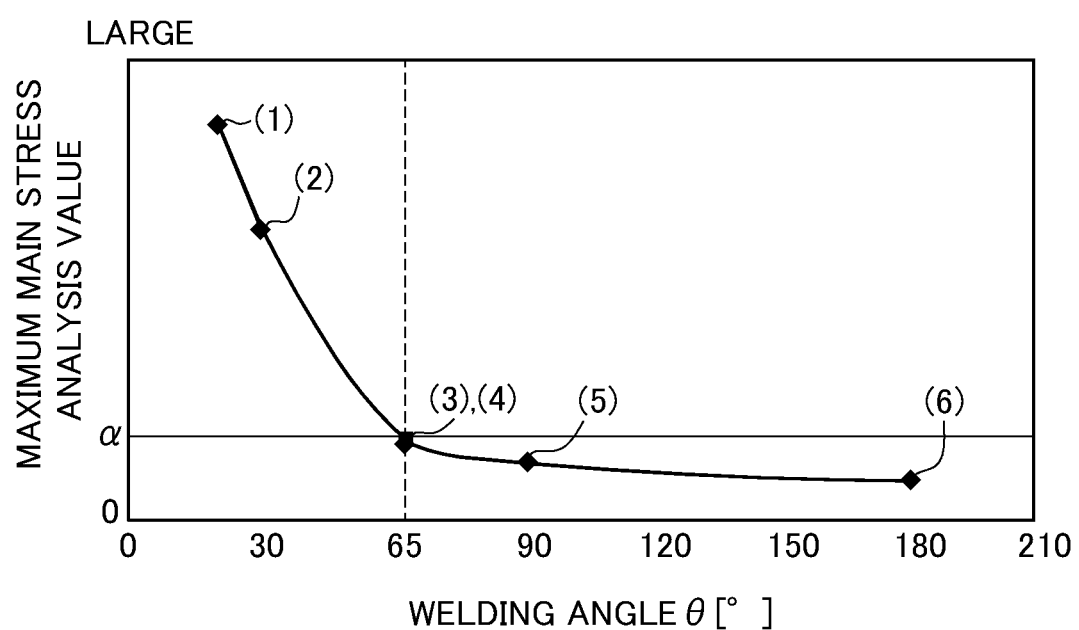
FIG. 14 is a correlation diagram of the weld angle and analysis values of the maximum principal stress.

Analysis results shown in FIG. 14 indicate that the analysis specifications (3), (4), (5), and (6) with the weld angle θ of 65° or more can achieve reduction of the maximum principal stress that has occurred in the stress concentrated region PX to a predetermined value α or less, namely to almost the similar value to the one ((6) in FIG. 14) with the weld angle θ of 180°. Accordingly, it has been found that the weld angle θ of 65° or more is desirable. Further, it has been found that the number of the welding spots 21 has no influence on the maximum principal stress.

However, in the analysis specification (6) arranged with one welding spot 21, the welding output is set as "large", and thus the required welding output is high. Accordingly, in the present embodiment, the plurality of welding spots 21 are provided and the weld angle θ is set to 65° or more so that the required welding output is restrained.

Further, the generated maximum main stresses in the analysis specifications (3) and (4) are almost same, and therefore, the analysis specification (4) is considered to be more preferable as a welding condition for restraining the required welding output to the maximum and improving the endurability of the welded part. As a result of the above, in the present embodiment, the most preferable welding condition is set as arranging two welding spots 21, creating a space between these two welding spots 21, and setting the weld angle θ to be 65° or more.

Figure 19:
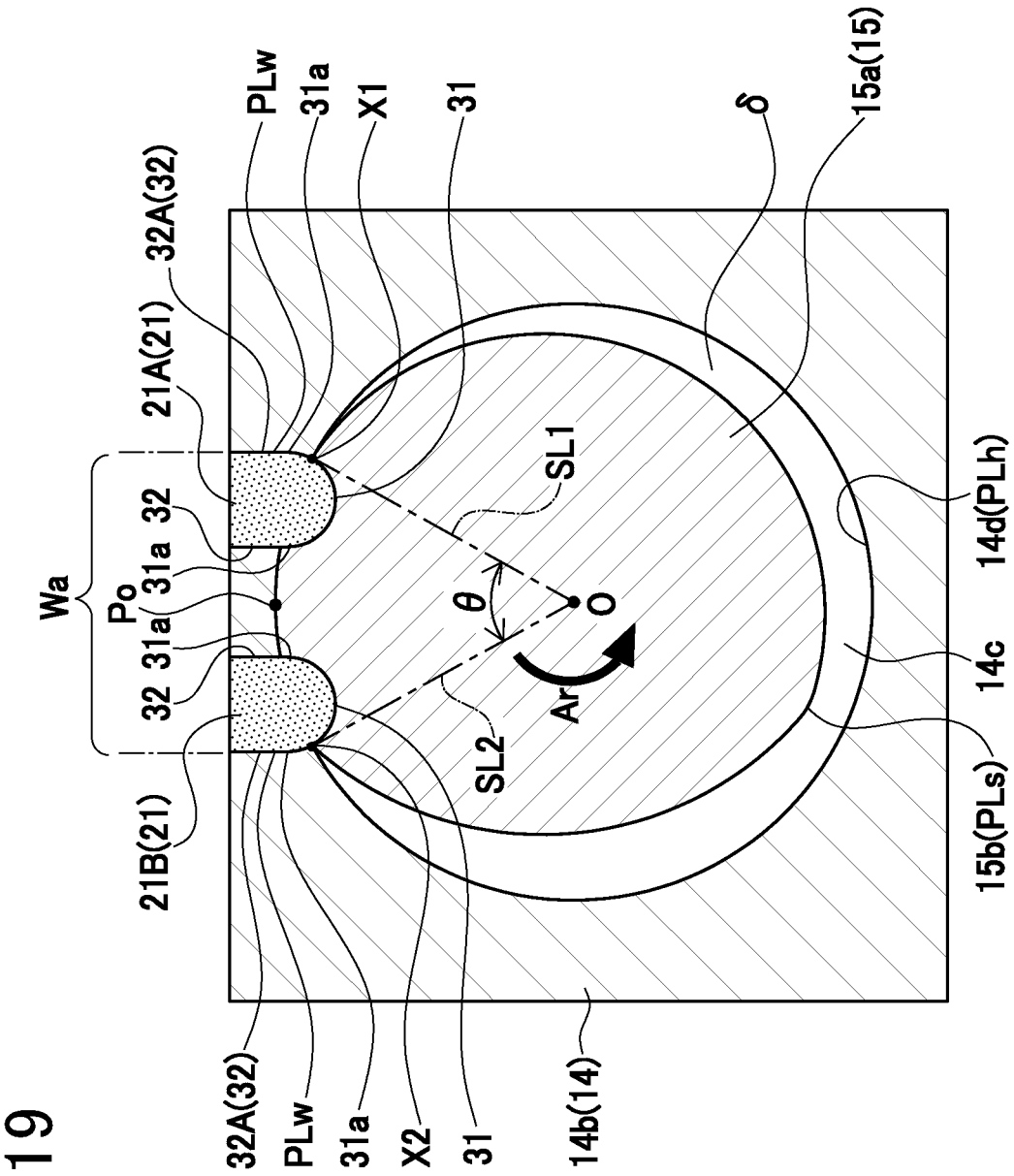
FIG. 19 is a sectional view illustrating a welding structure in a comparative example.

Herein, a position where the outer periphery PLs of the rotary shaft 15 intersects the outer periphery PLw of the welding spot 21 is noted. The outer periphery PLw of the welding spot 21 includes, as shown in FIG. 19, a curve-shaped portion 31 formed on a leading end in a direction extending from a side of the valve element 14 to a side of the rotary shaft 15 (in a weld-penetration direction during welding, or a downward direction in FIG. 19) and two linear portions 32 each connected to a circumferential end portion 31a of the curve-shaped portion 31. It is now considered a comparative example as shown in FIG. 19 that the welding is applied to a welding spot 21A and a welding spot 21B provided on both ends of the weld region Wa such that the outer periphery PLs of the rotary shaft 15 intersects the curve-shaped portion 31. In this example, the weld angle θ may have errors due to differences in the welding depth, that may cause error in the endurability of the welded part. Herein, the linear portion 32 is one example of a "side-face portion" of the present disclosure.

To address the above, in the present embodiment, the welding spot 21A and the welding spot 21B (one example of "both-end welding spots") provided on both ends of the weld region Wa are arranged to be welded such that the outer periphery PLs of the rotary shaft 15 intersects an outside linear portion 32A. This arrangement can restrain generation of errors in the weld angle θ due to the errors in the welding depth, thereby preventing errors in the endurability of the welded part. The outside linear portion 32A is the linear portion 32 located outside the weld region Wa among the two linear portions 32 on the outer periphery PLw of the welding spot 21A (the welding spot 21B). Further, in the example shown in FIG. 15, the welding spot 21A and the welding spot 21B are arranged in a radial direction of the rotary shaft 15 (specifically, a radial direction of the valve element 14), and an "arrangement direction of the welding spot" corresponds to the radial direction of the rotary shaft 15. Herein, the outside linear portion 32A is one example of an "outer side-face portion" of the present disclosure.

Figure 15:
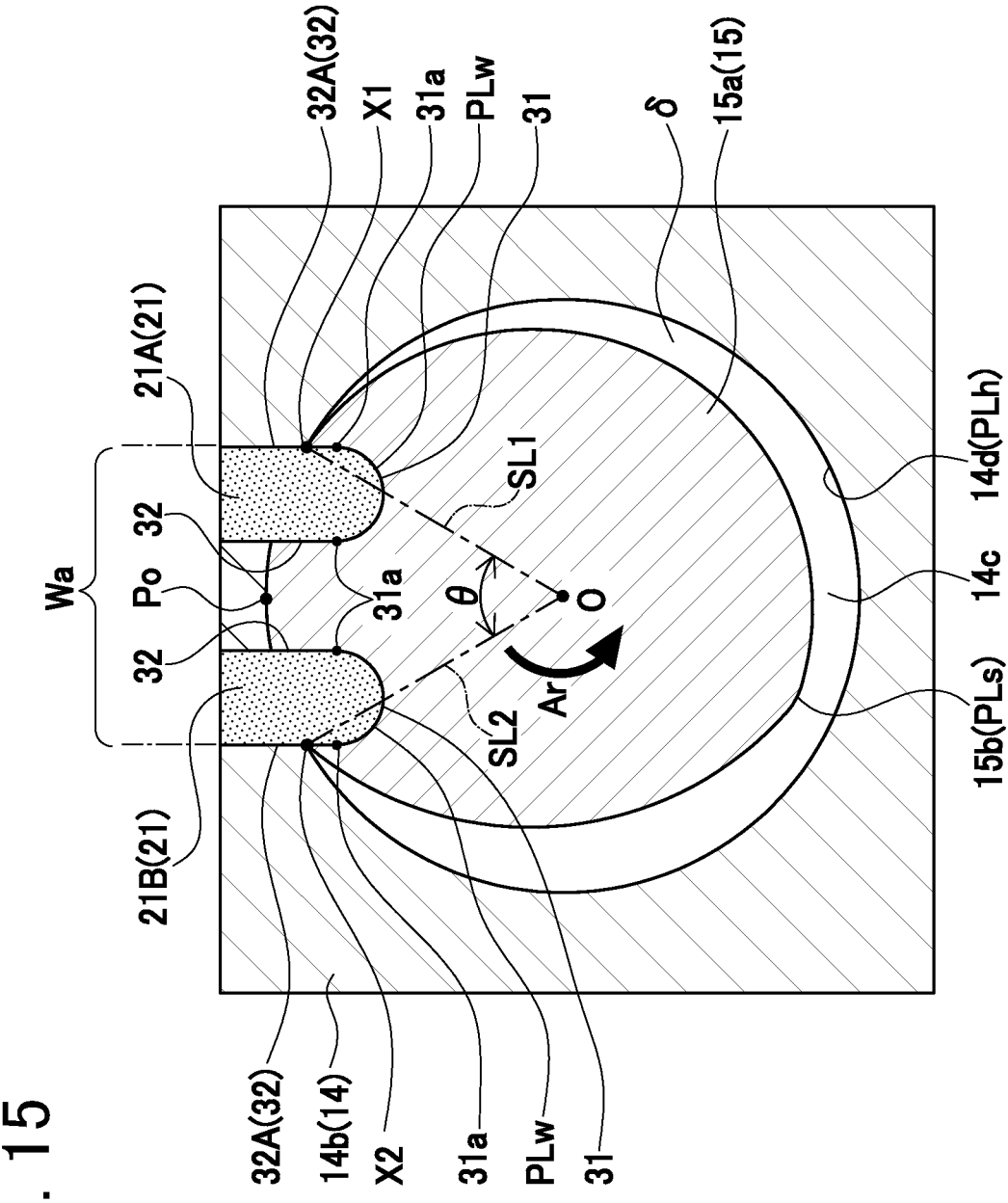
FIG. 15 is a sectional view showing one example of a welding structure of the present embodiment, illustrating a sectional view of the valve element and the rotary shaft when seen from an axial direction of the insertion hole of the valve element.

Specifically, in the present embodiment, as shown in FIG. 15, the outer periphery PLh (the inner wall surface 14d) of the insertion hole 14c of the valve element 14 is shaped to be circular and the outer periphery PLs (the outer peripheral surface 15b) of the pin 15a of the rotary shaft 15 is shaped to be almost circular in cross-section of the valve element 14 and the rotary shaft 15 when they are seen from an axial direction of the insertion hole 14c (in a frontward direction of a sheet of FIG. 15), for example. The outer periphery PLh of the insertion hole 14c and the outer periphery PLs of the pin 15a are made to be in contact at the contact point Po.

Further, two welding spots 21 are provided. Specifically, two welding spots 21 of the welding spot 21A and the welding spot 21B are provided with a clearance formed therebetween. Further, in a region outside the weld region Wa, there is created a clearance δ between the outer periphery PLh of the insertion hole 14c of the valve element 14 and the outer periphery PLs of the pin 15a of the rotary shaft 15.

In the welding spot 21A and the welding spot 21B, the valve element 14 and the rotary shaft 15 are welded such that the outside linear portion 32A in the outer periphery PLw intersects the outer periphery PLs of the pin 15a of the rotary shaft 15.

The weld angle θ is set to be 65° or more. Herein, the weld angle θ is defined by a first linear line SL1 connecting the first intersection X1 with the sectional center O of the rotary shaft 15 and a second linear line SL2 connecting the second intersection X2 with the sectional center O of the rotary shaft 15. The first intersection X1 is an intersection point of the outside linear portion 32A on the outer periphery PLw of the welding spot 21A with the outer periphery PLs of the rotary shaft 15. The second intersection X2 is an intersection point of the outside linear portion 32A on the outer periphery PLw of the welding spot 21B with the outer periphery PLs of the rotary shaft 15.

In the example shown in FIG. 15, two welding spots 21 are provided, but the number of the welding spots is not limited to two. The welding spots 21 may only be provided plurally, and thus three or more welding spots 21 may be provided.

Further, the weld angle θ (a first predetermined angle) is changeable depending on the shape of the outer periphery PLs of the rotary shaft 15. In the present embodiment, the shape of the outer periphery PLs of the rotary shaft 15 is made to be almost circular, and the weld angle θ is set to 65° or more. The shape of the outer periphery PLs of the rotary shaft 15 may be of a circular shape.

According to the above-mentioned present embodiment, in a cross-section of the valve element 14 and the rotary shaft 15 when seen from an axial direction of the insertion hole 14c, a plurality of the welding spots 21 are provided. Further, a welding spot 21A and a welding spot 21B are provided on both ends in an arrangement direction of the welding spot 21 in a weld region Wa constituted by the plurality of welding spots 21, and the valve element 14 and the rotary shaft 15 are welded in the welding spot 21A and the welding spot 21B such that the outside linear portions 32A on the outer periphery PLw intersect the outer periphery PLs of the rotary shaft 15 at the first intersection X1 and at the second intersection X2. Furthermore, a weld angle θ is formed by the first linear line SL1 linking the first intersection X1 with the sectional center O of the rotary shaft 15 and the second linear line SL2 linking the second intersection X2 with the sectional center O of the rotary shaft 15, and this weld angle θ is set to be a first predetermined angle or more.

The weld region Wa is thus constituted by a plurality of welding spots 21 to enlarge the weld angle θ, thus improving the endurability of the welded part without increasing the welding depth of the respective welding spots 21. Accordingly, the required welding output can be made small, thereby restraining welding distortion and sensitization of the welded part. Therefore, the present embodiment can achieve restraint of the required welding output and also achieve improvement in the endurability of the welded part.

Further, welding is performed such that the outside linear portions 32A of both of the welding spot 21A and the welding spot 21B intersect the outer periphery PLs of the rotary shaft 15, thereby restraining occurrence of errors in the weld angle θ and further restraining occurrence of errors in the endurability of the welded part.

Further, in the present embodiment, there is formed a clearance δ between the outer periphery PLh of the insertion hole 14c of the valve element 14 and the outer periphery PLs of the rotary shaft 15 in a region other than the weld region Wa. Especially in this structure formed with the clearance δ, stress is concentrated on the welding spots 21, and therefore the endurability in the stress concentrated part can be improved by adoption of the present technique.

Further in the present embodiment, the two welding spots 21 are provided as the welding spot 21A and the welding spot 21B that are spaced from each other. Accordingly, the weld angle θ can be made large while reducing the number of the welding spots 21 (in other words, a total welded area formed of the plurality of welding spots 21 is made small). Therefore, a total amount of output required for welding can be restrained and the endurability of the welded part can be improved.

Herein, the welding spots 21 are not necessarily spaced from one another as long as the weld angle θ is equal to or more than the first predetermined angle.

Further, the weld angle θ (the first predetermined angle) is changed depending on a shape of the outer periphery PLs of the rotary shaft 15, and in the present embodiment, the shape of the outer periphery PLs of the rotary shaft 15 is of a circular shape or an almost circular shape with arrangement of the weld angle θ of 65° or more. Thus, the endurability of the welding spots 21 can be improved to almost the maximum.

Further, when the weld angle θ is large and two welding spots 21 are provided, for example, these two welding spots 21 have a large distance from a center position of the weld region Wa. This may cause unpreferable welding that the valve element 14 is welded to the rotary shaft 15 with inclination caused by strong pulling of the valve element when the welding spot 21 on one end portion of the weld region Wa is to be welded. Therefore, the valve element 14 and the rotary shaft 15 may not be welded in a desired relative positional relationship.

Figure 16:
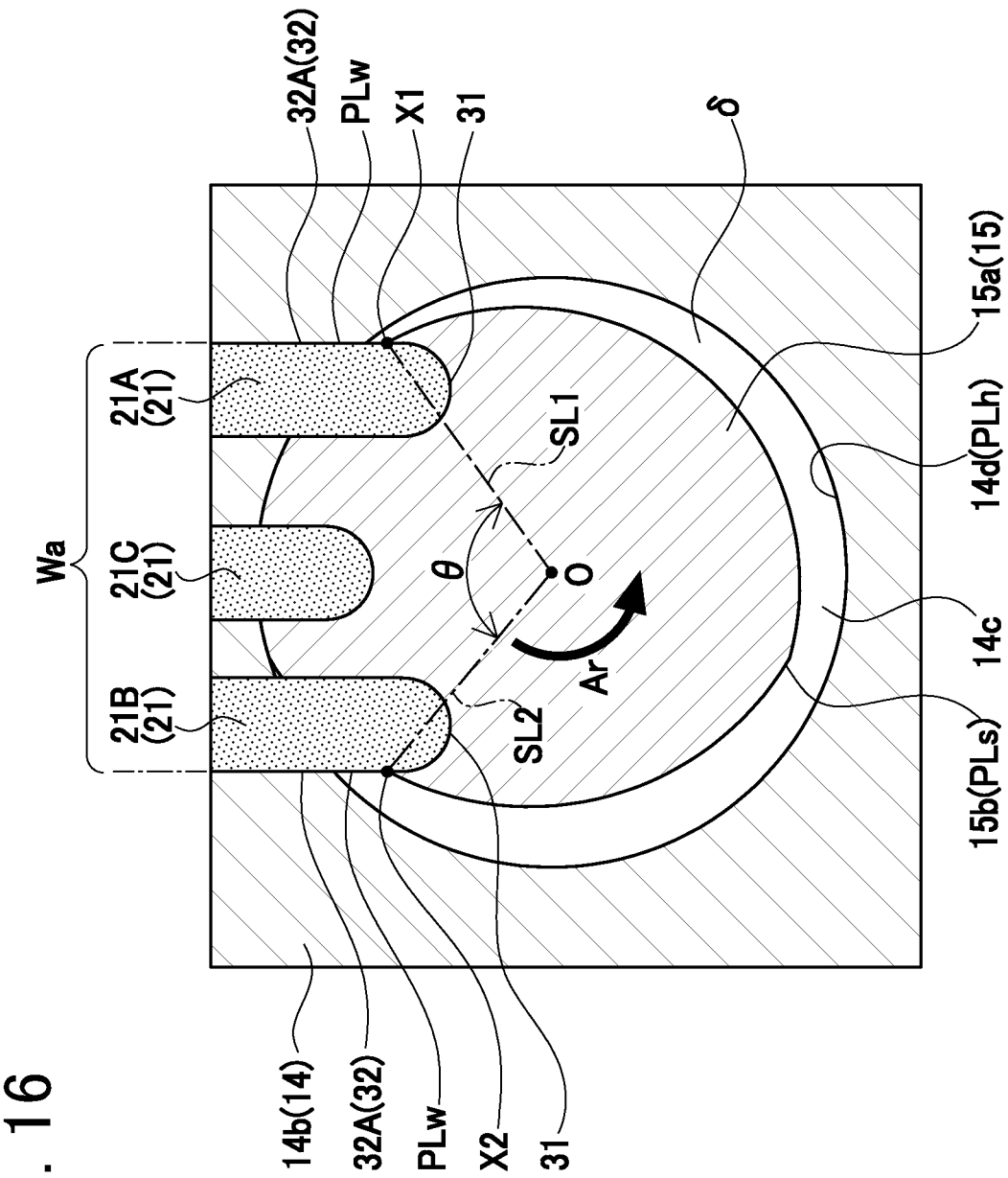
FIG. 16 is a sectional view illustrating a welding structure in a case of providing another welding spot between welding spots on both ends.

To address this, as shown in FIG. 16, when the weld angle θ is large and there is a possibility that the valve element 14 is to be welded with the rotary shaft 15 with inclination, another welding spot 21 (21C) is provided in advance between the welding spots 21 (the welding spot 21A and the welding spot 21B) on both ends in the weld region Wa. Specifically, in the present embodiment, when the weld angle θ is set to a second predetermined angle that is larger than the first predetermined angle (for example, larger than 65°) and that could cause inclination in the valve element 14, at least one welding spot 21 is provided in a center or an almost center of the weld region which is defined by the second predetermined angle. The rotary shaft 15 is thus fixed by providing one welding spot 21 in advance, and then the welding spots 21 on both ends are provided, thereby preventing inclination of the valve element 14. Accordingly, the valve element 14 and the rotary shaft 15 can be welded in a desired arrangement state. The "angle that could cause inclination in the valve element 14" is an angle that may cause welding of the valve element 14 and the rotary shaft 15 in an inclined state inclined from the desired arrangement position of the valve element 14 with respect to the rotary shaft 15. In FIG. 16, the weld angle θ is set to 100°, for example.

Figure 17:
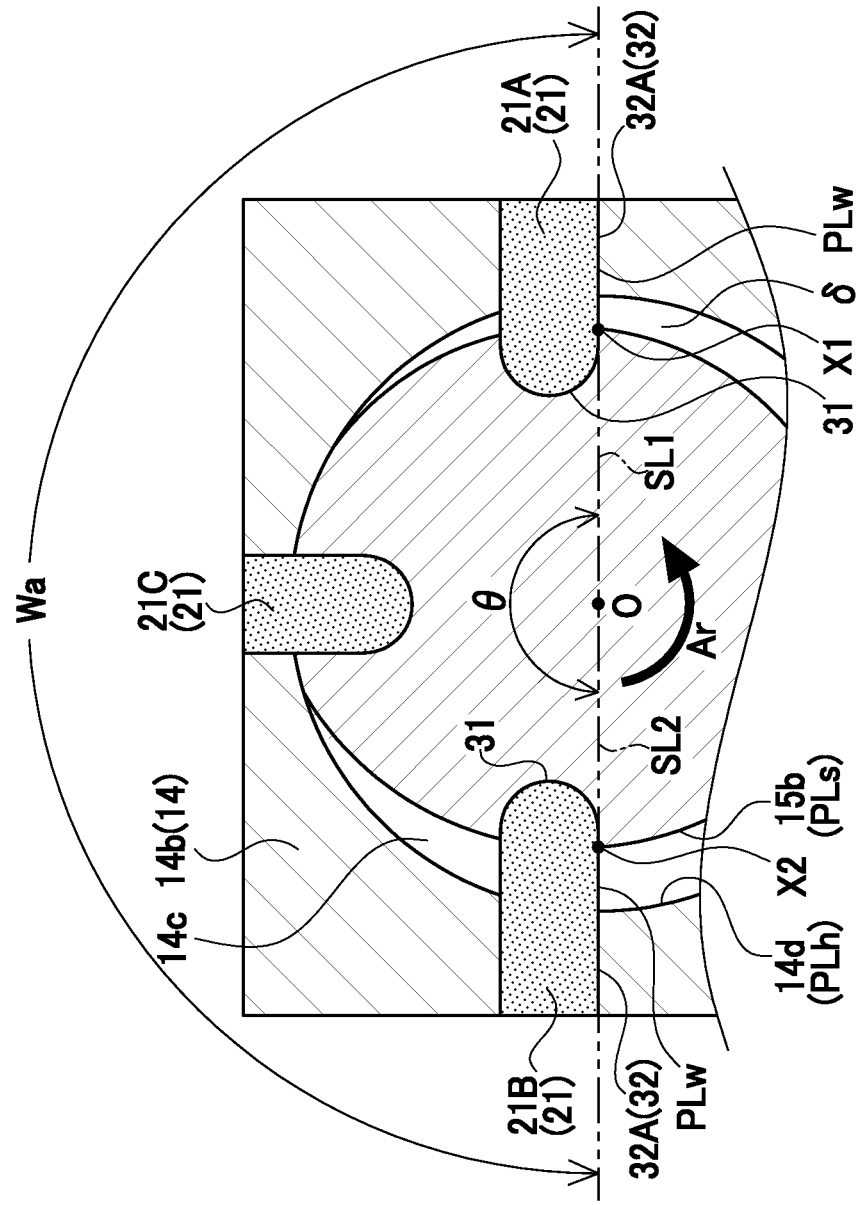
FIG. 17 is a sectional view illustrating a welding structure in another case of providing another welding spot between the welding spots on both ends.

Further, as shown in FIG. 17, another welding spot 21 (21C) may be provided in advance between the welding spots 21 (the welding spot 21A and the welding spot 21B) on both ends of the weld region Wa. In this example of FIG. 17, the welding spot 21A and the welding spot 21B are formed along a radial direction (a left and right direction or a lateral direction in FIG. 17) of the valve element 14. The welding spot 21A, the welding spot 21B, and the welding spot 21C are arranged in a circumferential direction of the rotary shaft 15, and this "arrangement direction of the welding spots" corresponds to a circumferential direction of the rotary shaft 15. In FIG. 17, the weld angle θ is set to 180°, for example.

The above-mentioned embodiments are only exemplification, and not made to limit the present disclosure, and thus various changes and modifications may be made without departing from the scope of the disclosure.

The welding structure of the present disclosure is not limited to the welding structure of the valve element 14 and the rotary shaft 15 mentioned above, and may be applied to any welding structure of a first member and a second member welded such that the second member is inserted in an insertion hole of the first member. For example, the welding structure of the present disclosure can be applied to a welding structure in which a gear and a shaft are welded such that the shaft is inserted in an insertion hole of the annular gear.

Further, the "side face portion" (the "outer side-face portion") of the present disclosure is not limited to a linear shaped one such as the linear portion 32 (the outside linear portion 32A), and may be shaped as the one other than a linear shape (for example, a curved shape).

REFERENCE SIGNS LIST

1 Flow control valve
2 Valve section
3 Motor section
13 Valve seat
13a Rubber sealing portion
14 Valve element
14c Insertion hole
14d Inner wall surface
15 Rotary shaft
15a Pin
15b Outer peripheral surface
16 Valve hole
17 Seat surface
18 Sealing surface
21 Welding spot
31 Curved portion
32 Linear portion
21A, 21B Welding spot
32A Outside linear portion PX Stress concentrated region
PLw Outer periphery (of a welding spot)
PLs Outer periphery (of a rotary shaft)
Wa Weld region
X1 First intersection
X2 Second intersection
O Sectional center (of a rotary shaft)
SL1 First linear line
SL2 Second linear line
α Predetermined value
θ Weld angle
δ Clearance

The invention claimed is:

1. A welding structure comprising a first member provided with an insertion hole and a second member, the welding structure being configured such that the second member is inserted in the insertion hole to be welded to the first member, wherein,
in a cross-section of the first member and the second member when they are seen from an axial direction of the insertion hole,
a plurality of welding spots where the first member and the second member are welded are provided,
an outer periphery of each of the welding spots is formed with a curve-shaped portion formed on a leading end in a direction from a first-member side to a second-member side and two side-face portions connected to both ends in a circumferential direction of the curve-shaped portion, respectively,
in both-end welding spots provided on both ends in an arrangement direction of the welding spots in a weld region that is formed of the plurality of welding spots, the first member and the second member are welded such that an outer side-face portion, which is one of the two side-face portions on the outer periphery of the both-end welding spots located on an outer side of the weld region, intersects with an outer periphery of the second member,
when two intersections where the outer side-face portion on the outer periphery of the both-end welding spots and the outer periphery of the second member intersect are defined as a first intersection and a second intersection, a weld angle formed by a first linear line linking the first intersection with a sectional center of the second member and a second linear line linking the second intersection with the sectional center of the second member is set to a first predetermined angle or more,
the outer periphery of the insertion hole of the first member and the outer periphery of the second member are arranged with a clearance in a region other than the weld region, and
the weld region is provided one.

2. The welding structure according to claim 1, wherein the plurality of welding spots are spaced from one another.

3. The welding structure according to claim 2, wherein the first member is a valve element, and
the second member is a rotary shaft for rotating the valve element.

4. The welding structure according to claim 3, wherein the valve element is a butterfly valve.

5. The welding structure according to claim 1, wherein the first member is a valve element, and
the second member is a rotary shaft for rotating the valve element.

6. The welding structure according to claim 5, wherein the valve element is a butterfly valve.

7. A welding structure comprising a first member provided with an insertion hole and a second member, the welding structure being configured such that the second member is inserted in the insertion hole to be welded to the first member, wherein,
in a cross-section of the first member and the second member when they are seen from an axial direction of the insertion hole,
a plurality of welding spots where the first member and the second member are welded are provided,
an outer periphery of each of the welding spots is formed with a curve-shaped portion formed on a leading end in a direction from a first-member side to a second-member side and two side-face portions connected to both ends in a circumferential direction of the curve-shaped portion, respectively,
in both-end welding spots provided on both ends in an arrangement direction of the welding spots in a weld region that is formed of the plurality of welding spots, the first member and the second member are welded such that an outer side-face portion, which is one of the two side-face portions on the outer periphery of the both-end welding spots located on an outer side of the weld region, intersects with an outer periphery of the second member,
when two intersections where the outer side-face portion on the outer periphery of the both-end welding spots and the outer periphery of the second member intersect are defined as a first intersection and a second intersection, a weld angle formed by a first linear line linking the first intersection with a sectional center of the second member and a second linear line linking the second intersection with the sectional center of the second member is set to a first predetermined angle or more,
the first predetermined angle is 65°, and
two welding spots are provided with a space arranged therebetween.

8. The welding structure according to claim 7, wherein the first member is a valve element, and
the second member is a rotary shaft for rotating the valve element.

9. The welding structure according to claim 8, wherein the valve element is a butterfly valve.

10. A welding structure comprising a first member provided with an insertion hole and a second member, the welding structure being configured such that the second member is inserted in the insertion hole to be welded to the first member, wherein,
in a cross-section of the first member and the second member when they are seen from an axial direction of the insertion hole,
a plurality of welding spots where the first member and the second member are welded are provided,
an outer periphery of each of the welding spots is formed with a curve-shaped portion formed on a leading end in a direction from a first-member side to a second-member side and two side-face portions connected to both ends in a circumferential direction of the curve-shaped portion, respectively,
in both-end welding spots provided on both ends in an arrangement direction of the welding spots in a weld region that is formed of the plurality of welding spots, the first member and the second member are welded such that an outer side-face portion, which is one of the two side-face portions on the outer periphery of the both-end welding spots located on an outer side of the weld region, intersects with an outer periphery of the second member, when two intersections where the outer side-face portion on the outer periphery of the both-end welding spots and the outer periphery of the second member intersect are defined as a first intersection and a second intersection, a weld angle formed by a first linear line linking the first intersection with a sectional center of the second member and a second linear line linking the second intersection with the sectional center of the second member is set to a first predetermined angle or more, when the weld angle is set to a second predetermined angle that is larger than the first predetermined angle and that has a possibility of causing inclination of the first member, at least one welding spot is provided in a center or an almost center of the weld region defined by the second predetermined angle.

11. The welding structure according to claim 10, wherein the first member is a valve element, and the second member is a rotary shaft for rotating the valve element.

12. The welding structure according to claim 11, wherein the valve element is a butterfly valve.

* * * * *